(12) United States Patent
Abe et al.

(10) Patent No.: US 9,950,603 B2
(45) Date of Patent: Apr. 24, 2018

(54) VEHICLE FRONT STRUCTURE

(71) Applicant: HONDA MOTOR CO., LTD., Tokyo (JP)

(72) Inventors: Yuya Abe, Utsunomiya (JP); Ryoichi Yoshitomi, Utsunomiya (JP); Choichi Ishikawa, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/285,804

(22) Filed: Oct. 5, 2016

(65) Prior Publication Data
US 2017/0113533 A1 Apr. 27, 2017

(30) Foreign Application Priority Data
Oct. 22, 2015 (JP) ................................ 2015-207876

(51) Int. Cl.
*B60K 5/12* (2006.01)
*B62D 21/11* (2006.01)
*B62D 21/15* (2006.01)

(52) U.S. Cl.
CPC ............... *B60K 5/12* (2013.01); *B62D 21/11* (2013.01); *B62D 21/15* (2013.01); *B62D 21/155* (2013.01)

(58) Field of Classification Search
CPC ...... B60K 5/12; B60K 5/1216; B60K 5/1275; B62D 21/15; B62D 21/155
See application file for complete search history.

(56) References Cited

U.S. PATENT DOCUMENTS

| 4,073,357 | A | | 2/1978 | Danckert | |
|---|---|---|---|---|---|
| 4,270,625 | A | * | 6/1981 | Nishimura | ........... B60K 5/1216 180/291 |
| 4,836,321 | A | * | 6/1989 | Baumann | ................ B60R 19/00 180/232 |
| 5,086,860 | A | * | 2/1992 | Francis | ............... H01M 2/1083 180/68.5 |
| 5,564,769 | A | * | 10/1996 | Deneau | ................ B62D 25/145 180/90 |

(Continued)

FOREIGN PATENT DOCUMENTS

JP  S63-263135 A  10/1988
JP  A-01-202525  8/1989

(Continued)

OTHER PUBLICATIONS

Notice of Allowance with English Language Translation dated Jul. 25, 2017, issued in JP patent application No. 2015-207876 (6 pages).

*Primary Examiner* — Frank B Vanaman
(74) *Attorney, Agent, or Firm* — Drinker Biddle & Reath LLP

(57) ABSTRACT

A vehicle front structure includes a connecting member (10) formed of a belt-shaped metal plate, the connecting member (10) has a plate-shaped bottom section (11), a first folded section (12) formed by folding a circumferential edge of the bottom section (11) and a circumferential wall section (13) that is formed in a continuous annular shape and that continues to the bottom section (11) via a folded section (12), and the bottom section (11) of the connecting member is formed in a V shape upward or downward in a longitudinal direction.

12 Claims, 14 Drawing Sheets

(56) References Cited

U.S. PATENT DOCUMENTS

| | | | |
|---|---|---|---|
| 2004/0195020 A1* | 10/2004 | Suwa | B60K 11/04 |
| | | | 180/68.4 |
| 2005/0199775 A1* | 9/2005 | Kaminski | F16F 1/371 |
| | | | 248/638 |
| 2013/0112842 A1* | 5/2013 | Narita | B60K 5/1208 |
| | | | 248/634 |
| 2013/0140852 A1* | 6/2013 | Takeda | B62D 25/082 |
| | | | 296/203.02 |

FOREIGN PATENT DOCUMENTS

| | | |
|---|---|---|
| JP | A-2004-161056 | 6/2004 |
| JP | A-2008-168792 | 7/2008 |
| JP | A-2009-234564 | 10/2009 |

\* cited by examiner

VEHICLE FRONT STRUCTURE

CROSS-REFERENCE TO RELATED APPLICATION

Priority is claimed on Japanese Patent Application No. 2015-207876, filed on Oct. 22, 2015, the contents of which are incorporated herein by reference.

BACKGROUND OF THE INVENTION

Field of the Invention

The present invention relates to a vehicle front structure.

Description of Related Art

In the related art, a vehicle front structure in which an engine and a front side frame are connected by a tension band to absorb energy upon offset collision is known (for example, see Japanese Unexamined Patent Application, First Publication No. S63-263135).

In addition, a vehicle front structure in which an engine jumping-out prevention member that bridges left and right front side frames is provided is known (for example, see U.S. Pat. No. 4,073,357).

SUMMARY OF THE INVENTION

However, in vehicle front structures disclosed in Japanese Unexamined Patent Application, First Publication No. S63-263135 and U.S. Pat. No. 4,073,357, when energy is absorbed upon various types of collisions, there is room for improvement in energy absorption.

That is, in the vehicle front structure of Japanese Unexamined Patent Application, First Publication No. S63-263135, while forward movement of an engine (a power unit) is suppressed upon offset collision (upon small overlap collision (micro-lap) such as collision with the outside of the front side frame), a tension band does not contribute to energy absorption upon full flat collision such as collision with the entire surface of the vehicle front section.

In addition, in the vehicle front structure of U.S. Pat. No. 4,073,357, while the energy can be absorbed at the engine jumping-out prevention member even upon full flat collision, stress concentration of the engine jumping-out prevention member with respect to a power unit and a vehicle body at a fastening section is concerned.

Here, an aspect of the present invention is directed to provide a vehicle front structure including a connecting member configured to connect a power unit and a vehicle body such that, in either of small overlap collision and full flat collision, energy can be absorbed by the connecting member, and stress concentration of the connecting member with respect to a power unit and a vehicle body at a fastening section is avoided.

In order to solve the above-mentioned problems and accomplish the purposes related thereto, the present invention employs the following aspects.

(1) A vehicle front structure according to an aspect of the present invention includes a connecting member formed of a belt-shaped metal plate configured to couple a power unit and a vehicle body, wherein the connecting member includes a plate-shaped bottom section, a first folded section formed by folding a circumferential edge of the bottom section and a circumferential wall section that is formed in a continuous annular shape and that continues to the bottom section via the first folded section, and wherein the bottom section of the connecting member is formed in a V shape protruding upward or downward in a longitudinal direction.

(2) In the aspect of above mentioned (1), a second folded section bent upward or downward may be formed at the bottom section, and wherein a hole forming section may be formed in the connecting member, the hole forming section forming holes at a position that corresponds to the second folded section in the first folded section, the holes being formed to a size at which the circumferential wall section remains.

(3) In the aspect of above mentioned (1) or (2), the connecting member may connect a mount section of the power unit and a damper housing of the vehicle body in the longitudinal direction with respect to the front side frame of the vehicle body.

(4) In the aspect of above mentioned (2), a third folded section bent in a laterally direction may be formed in the connecting member at a position different from the second folded section of the bottom section when seen in a plan view, and wherein a bead shape that does not cross the second folded section may be formed at the third folded section.

(5) In the aspect of above mentioned (3), further comprising a connecting bracket including a sidewall section fixed to an inner sidewall of the damper housing of the vehicle body and a lateral wall section having a fastening seat surface formed by folding a lower end of the sidewall section toward a center in a vehicle body widthwise direction, wherein at least two fastening sections may be provided at the connecting member, wherein the connecting bracket may be fastened with a first fastening section of the connecting member, wherein a plurality of fixing sections for fixing the side wall section to the inner sidewall of the damper housing of the vehicle body may be formed at front and rear sides of the sidewall section, wherein the plurality of fixing sections may respectively include a plurality of coupling sections arranged in upward and downward direction, wherein the plurality of fixing sections may be arranged so that each of central axes defined by alignments of the plurality of coupling sections become gradually more inclined toward rearward as the central axe is positioned at more rear side, and wherein bead shapes in a vertical direction may be formed between the plurality of fixing sections.

(6) In the aspect of above mentioned (3), further comprising a connecting bracket fixed to the dumper housing, wherein at least two fastening sections may be provided at the connecting member, wherein a first fastening section of the connecting member may be fastened to the connecting bracket, and the connecting bracket may include a clearance-shaped section with respect to a cable of an electronic part and an attachment seat surface configured to attach a band clip of the cable.

(7) In the aspect of above mentioned (6), a second fastening section of the connecting member may be fastened to the mount section of the power unit, and may be arranged at the substantially same vertical height as the first fastening section.

(8) In the aspect of above mentioned (7), the mount section of the power unit may include a front fastening section and a rear fastening section fixed to the front side frame at front and rear sides of the folded section of the forward side of the front side frame.

(9) In the aspect of above mentioned (3), further comprising the power unit including a fuel cell stack, a motor and a transmission, the front side frame and a sub-frame fixed to the front side frame, the power unit may be mounted on a sub-frame, the fuel cell stack may be fixed to the mount section and a stack sub-frame fastening section of the sub-frame, the motor and the transmission may be fixed to a motor/mission sub-frame fastening section of the sub-frame, the front side frame may be folded and deformed upon collision from a forward side, and the sub-frame may be able to be folded and deformed in a V shape protruding downward upon collision from the forward side to fall from the front side frame.

(10) In the aspect of above mentioned (9), further comprising a power control unit, in the power unit, the fuel cell stack may be arranged above the motor and the transmission and, the power control unit may be arranged in front of the power unit.

According to the vehicle front structure of (1), since the belt-plate shaped connecting member has the first folded section and the circumferential wall section at the circumferential edge of the bottom section, sufficient strength can be provided in the connecting member to increase absorption amount of energy due to deformation.

In addition, upon full flat collision, since the connecting member is deformed while being folded in a V shape to absorb energy, stress concentration of the fastening section can be suppressed, and an energy absorption amount can be increased because deformation of the front side frame is not interfered with the connecting member.

In addition, upon small overlap collision, since the connecting member is deformed while the V shape is flatly stretched to absorb energy, stress concentration of the fastening section can be similarly suppressed, and the power unit can be suppressed from jumping out to the front.

In this way, in either of small overlap collision and full flat collision, energy absorption by the connecting member becomes possible, and stress concentration of the connecting member with respect to the power unit and the vehicle body at the fastening section can be avoided. Moreover, an energy absorption amount can be increased and the power unit can be suppressed from jumping out to the front. Further, since the connecting member has the circumferential wall section formed in a continuous annular shape, it is possible to increase the support stiffness of the power unit and to suppress the vibration of the power unit.

According to above mentioned (2), it is possible to set a low strength section from the second folded section as a starting point of folding when the connecting member is deformed upon collision without losing support stiffness of the power unit by the connecting member due to the annular circumferential wall section. Therefore, an energy absorption amount of the front side frame can be increased since folding and deformation of the V shape of the connecting member upon full flat collision becomes easy, and since deformation of the front side frame is not further interfered with the connecting member.

According to above mentioned (3), it is possible to set a sufficient deformation space between the mount section of the power unit and the damper housing of the vehicle body. Therefore, upon full flat collision, the connecting member does not interfere with absorption of energy during deformation of the front side frame as the connecting member is deformed while being folded in a V shape, and upon small overlap collision, the power unit can be suppressed from jumping out to the front as the connecting member is deformed while the V shape is flatly stretched.

According to above mentioned (4), the connecting member can be displaced in the lateral direction to secure a disposition space of the power unit and peripheral parts without interfering with deformation of the second folded section of the connecting member.

According to above mentioned (5), even when the connecting bracket configured to fasten the connecting member is fixed to the damper housing by welding, support strength can be improved by a load in a shearing direction of the welded section, and the power unit can be further suppressed from jumping out.

According to above mentioned (6), overhanging of the cable into the mounting space of the power unit can be suppressed, and the mounting space of the power unit can be effectively used.

According to above mentioned (7), with respect to collision in the longitudinal direction, upon full flat collision, the connecting member is easily deformed while being folded in a V shape, and upon small overlap collision, since the connecting member is easily deformed while the V shape is flatly stretched, energy can be effectively absorbed.

According to above mentioned (8), upon small overlap collision, when the front side frame is folded at the folded section, since the front fastening section and the rear fastening section of the mount section are similarly broken, movement in the vehicle widthwise direction of the mount section is suppressed, and the connecting member maintains a posture in the longitudinal direction. Accordingly, separation of the connecting bracket from the damper housing can be suppressed, the connecting bracket and the connecting member can be supported by a load in a strong shearing direction, and the power unit can be further suppressed from jumping out.

According to above mentioned (9), upon full flat collision and small overlap collision, since the sub-frame on which the power unit is mounted falls from the front side frame, the power unit can be suppressed from being retracted to deform the dash lower panel into the vehicle compartment.

According to above mentioned (10), the power unit and the power control unit can be efficiently disposed, and the mounting space of the power unit can be effectively used.

DETAILED DESCRIPTION OF THE INVENTION

Figure 1:
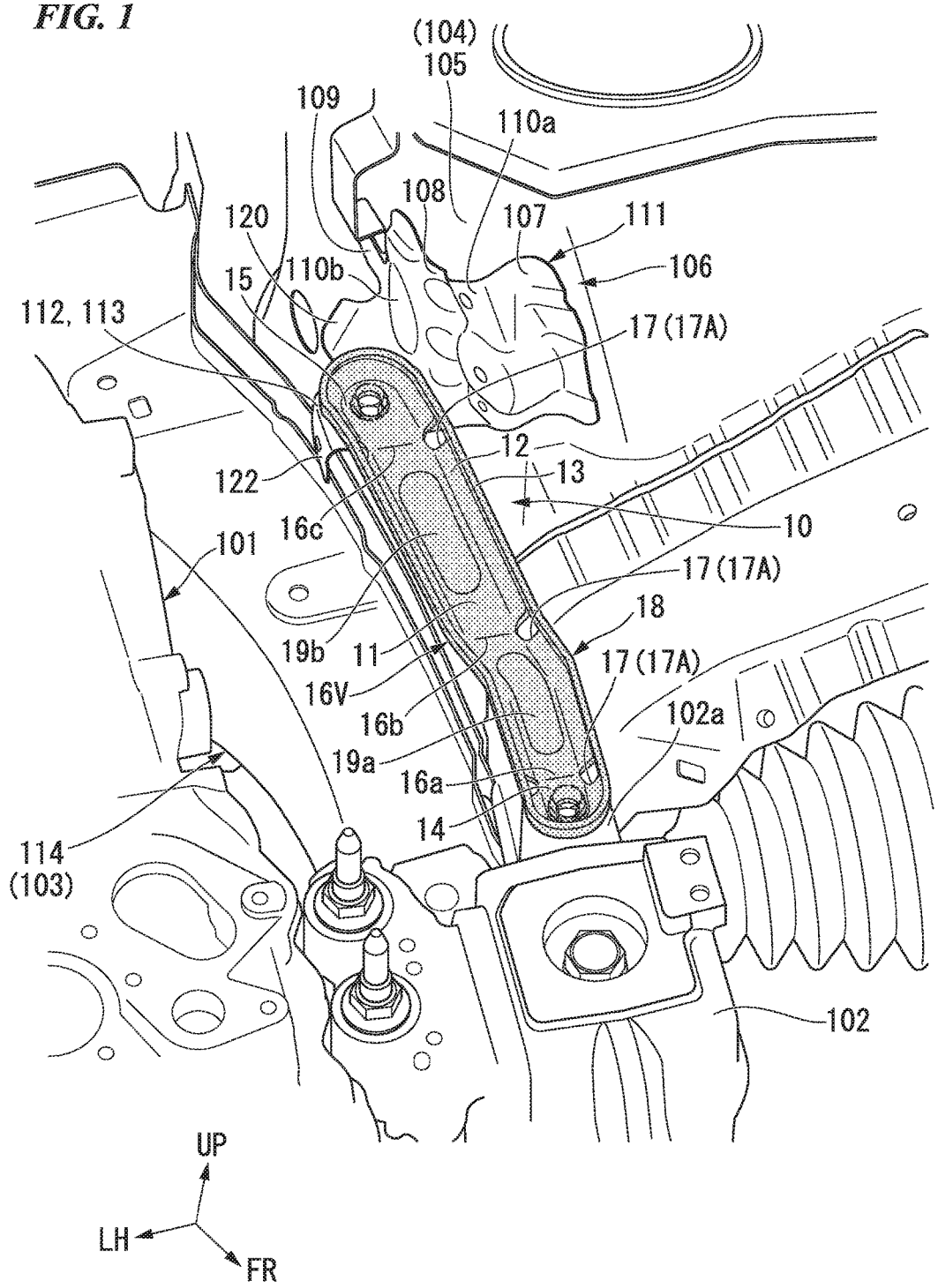
FIG. 1 is a perspective view showing a right side of a vehicle front structure according to an embodiment of the present invention when seen from the inside in a vehicle widthwise direction.

Hereinafter, an embodiment of the present invention will be described based on the accompanying drawings. Further, directions of forward, rearward, leftward, rightward, and so on, in the following description are the same as directions of a vehicle in the following description unless the context clearly indicates otherwise.

In addition, an arrow FR showing a forward side of a vehicle, an arrow LH showing a left side of the vehicle, and an arrow UP showing an upward side of the vehicle are shown at appropriate places in the drawings used for the following description.

As shown in FIG. 1, a vehicle front structure of the embodiment includes a connecting member 10 configured to couple a mount section 102 of a power unit 101 and a damper housing 104 that constitutes a vehicle body 103.

Figure 2:
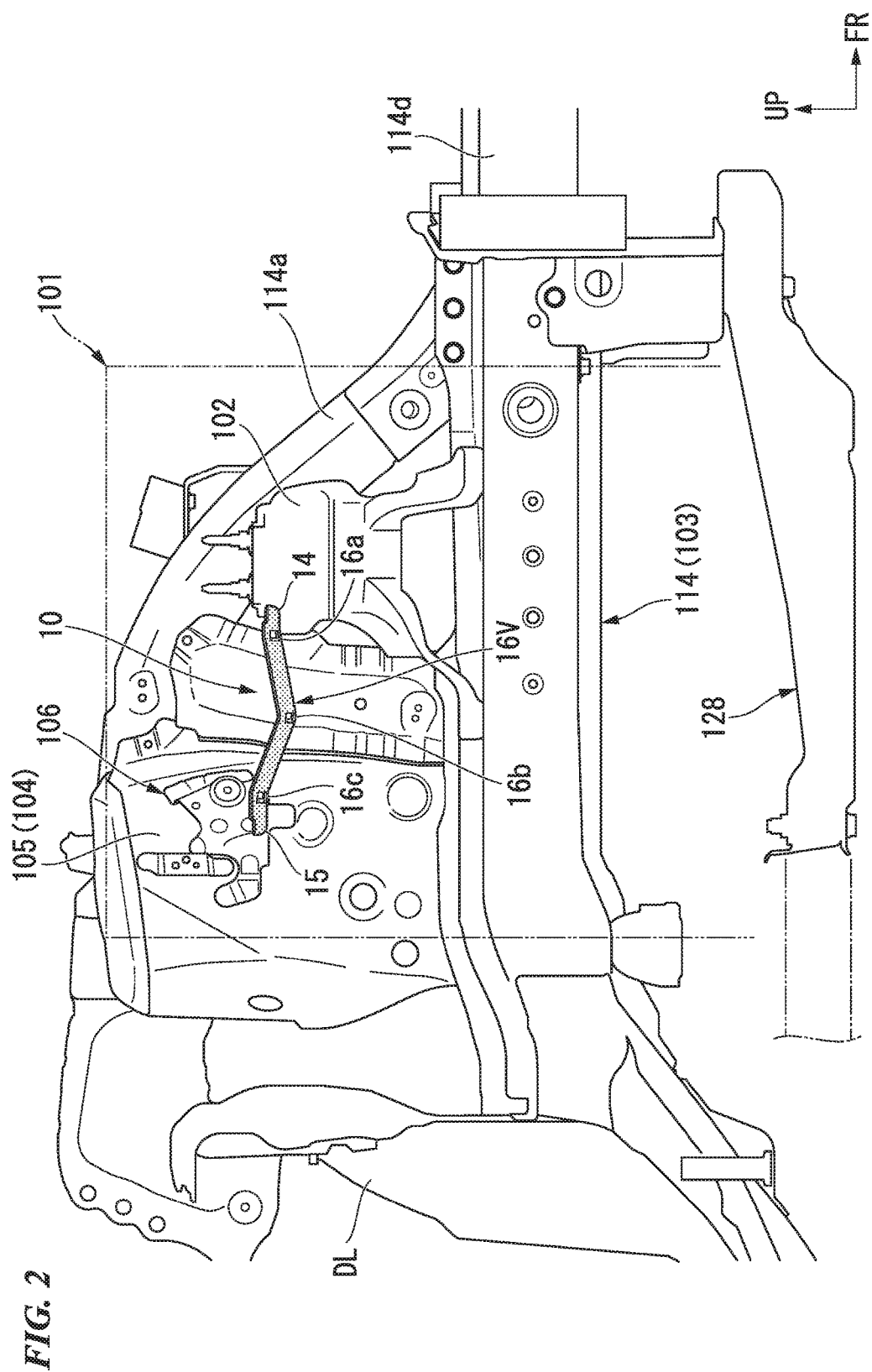
FIG. 2 is a side view of the right side of the vehicle front structure when seen from the inside in the vehicle widthwise direction.
Figure 12:
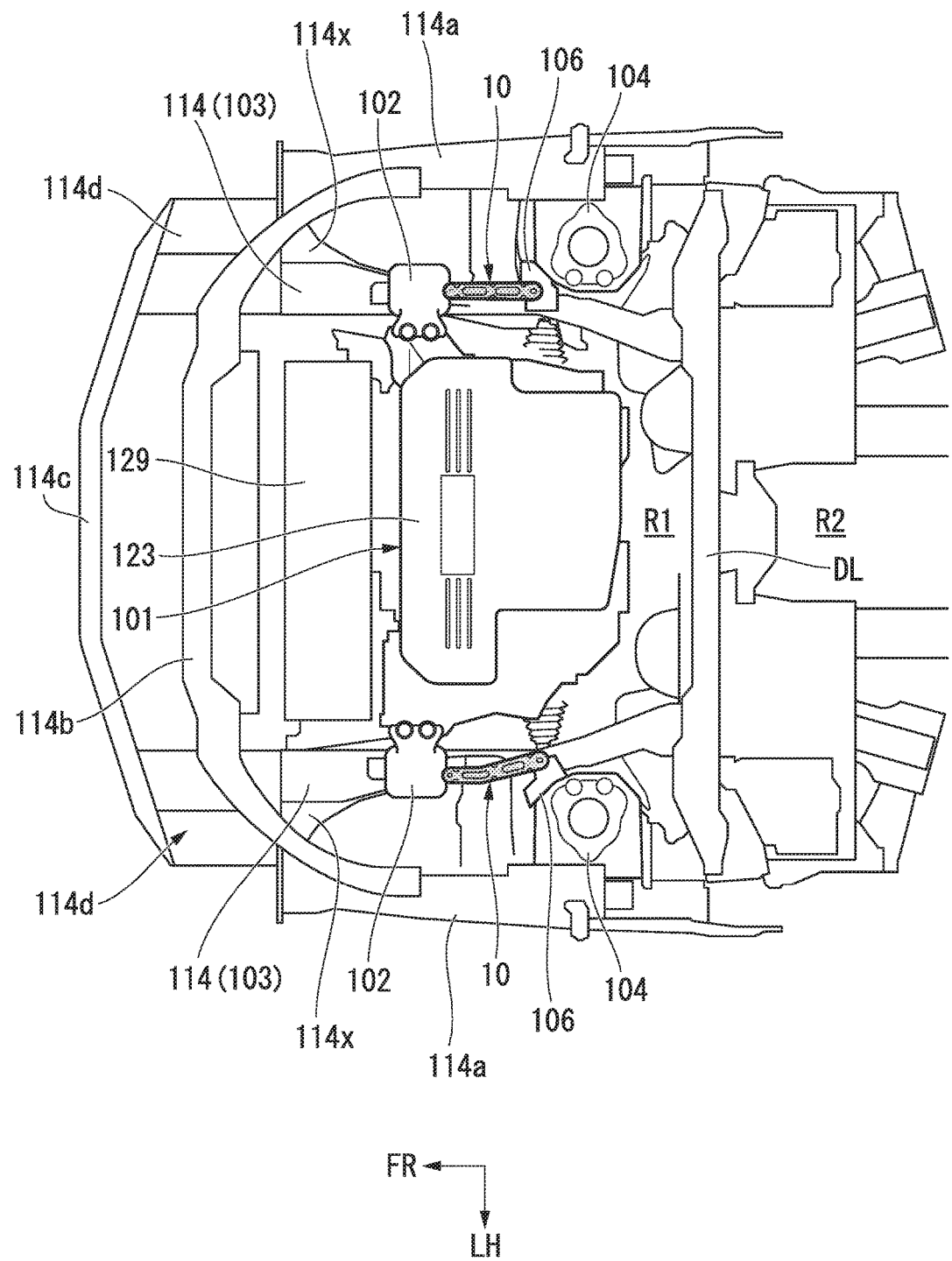
FIG. 12 is a plan view of the vehicle front structure.

Here, as shown in FIGS. 2 and 12, in a front section of the vehicle body 103, a front side frame 114 extending in a vehicle longitudinal direction and the damper housing 104 configured to support an upper end section of a suspension damper above the front side frame 114 are installed at both side sections of a vehicle body widthwise direction (a lateral direction) of an engine room (a motor room) R1 disposed in front of a vehicle compartment R2. A dash lower panel DL is disposed between the vehicle compartment R2 and the engine room R1.

Upper members 114a extending in the vehicle longitudinal direction are installed at both side sections in the vehicle body widthwise direction above the engine room R1. The upper members 114a are disposed above the front side frame 114 and outside in the vehicle body widthwise direction, and the damper housing 104 is installed to cross between the upper member 114a and the front side frame 114. A radiator core support 114b is bridged between front sections of the left and right upper members 114a. The front sections of the upper members 114a are curved downward and disposed outside in the vehicle body widthwise direction of the front section of the front side frame 114, and the front sections are coupled to each other. A front bumper beam 114c is coupled to a forward side of the front side frame 114 via a bumper beam extension 114d to configure a circumferential wall section formed in a continuous annular shape.

Returning to FIG. 1, the connecting member 10 is a belt-shaped metal plate having a previously determined thickness dimension, and is integrally formed by pressing a steel plate. The connecting member 10 has a plate-shaped bottom section 11, a folded section 12 (first folded section) formed by folding a circumferential edge of the bottom section 11 and a circumferential wall section 13 that continues to the bottom section 11 via a folded section 12. The circumferential wall section 13 is formed in a continuous endless shape along the circumferential edge of the bottom section 11.

The connecting member 10 extends in a longitudinal direction while being appropriately bent. The connecting member 10 fastens a front fastening section 14 (second fastening section) having a front end section to the mount section 102 and fastens a rear fastening section 15 (first fastening section) having a rear end section to the damper housing 104. A mount-side fastening section 102a configured to fasten the front fastening section 14 is formed at the mount section 102, and a connecting bracket 106 configured to fasten the rear fastening section 15 is joined to the damper housing 104.

Figure 3:
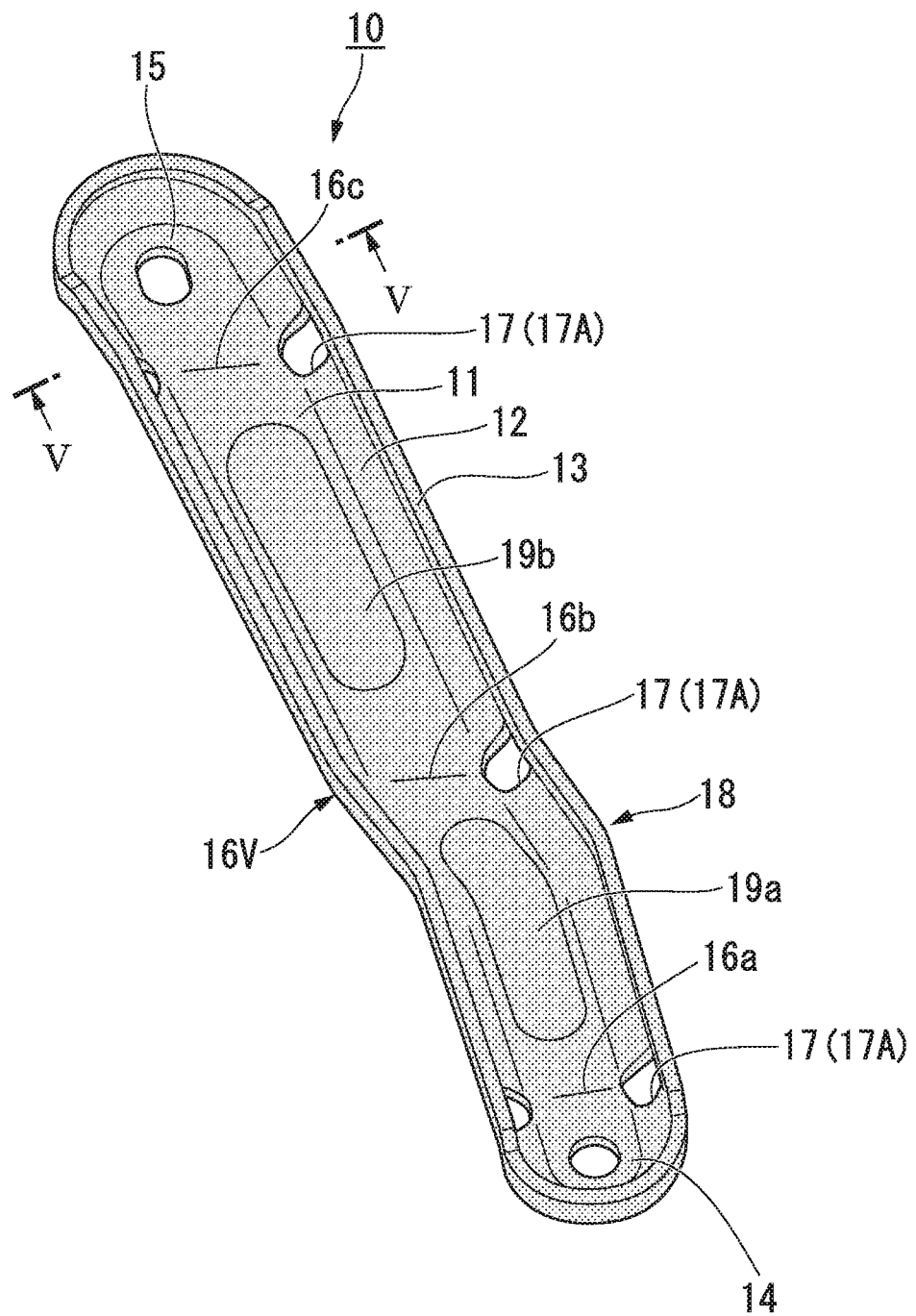
FIG. 3 is a perspective view of a connecting member of the right side of the vehicle front structure.

As shown in FIG. 3, the connecting member 10 has vertically folded sections 16a, 16b and 16c (second folded sections) formed respectively at three places of a front end section side, intermediate section in the front and rear direction and rear end section side of the bottom section 11. Specifically, a folded section 16a protruding upward is formed at a rear end of the front fastening section 14, and a folded section 16c similarly protruding upward is formed at a front end of the rear fastening section 15. The front fastening section 14 and the rear fastening section 15 of the connecting member 10 are substantially horizontally formed, and a folded section 16b protruding downward is formed at an intermediate section between the front fastening section 14 and the rear fastening section 15. A V-shaped section 16V that forms a vertically shallow V shape is formed between the front fastening section 14 and the rear fastening section 15.

Further, the V-shaped section 16V may be formed in an inverted V shape protruding upward, instead of the V shape protruding downward in the longitudinal direction.

Figure 4:
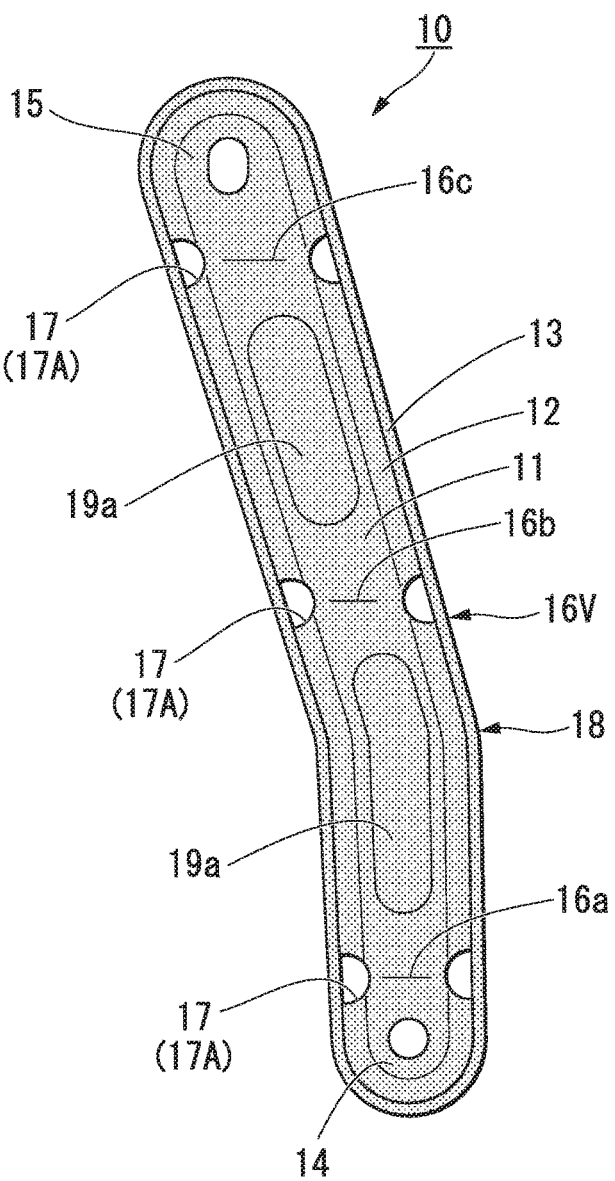
FIG. 4 is a plan view of the connecting member.

As shown in FIG. 4, the connecting member 10 has a folded section 18 (third folded section) formed at a position different from the vertically folded sections 16a, 16b and 16c of the bottom section 11 and folded leftward and rightward at a predetermined angle when seen in a plan view. The folded section 18 is formed between the folded section 16a and the folded section 16b in the V-shaped section 16V. A bead shape 19a that does not cross the folded section 16a and the folded section 16b is formed at the folded section 18. A bead shape 19b that does not cross the folded section 16b and the folded section 16c is formed between the folded section 16b and the folded section 16c in the V-shaped section 16V. The bead shapes 19a and 19b can improve strength and stiffness without interfering with folding and deformation of the folded sections 16a, 16b and 16c of the connecting member 10.

Figure 5:
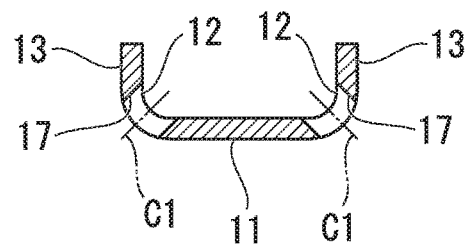
FIG. 5 is a cross-sectional view taken along line V-V of FIG. 3.

As shown in FIGS. 4 and 5, the connecting member 10 includes a hole forming section 17A in which holes 17 are formed at positions that corresponds to or coincide with the respective folded sections 16a, 16b and 16c of the bottom section 11 in the folded section 12 of the circumferential edge of the bottom section 11. The holes 17 are pierced in a circular shape about a bisector C1 of a folding angle of the folded section 12. The holes 17 are formed to a size at which the circumferential wall section 13 remains.

Figure 6:
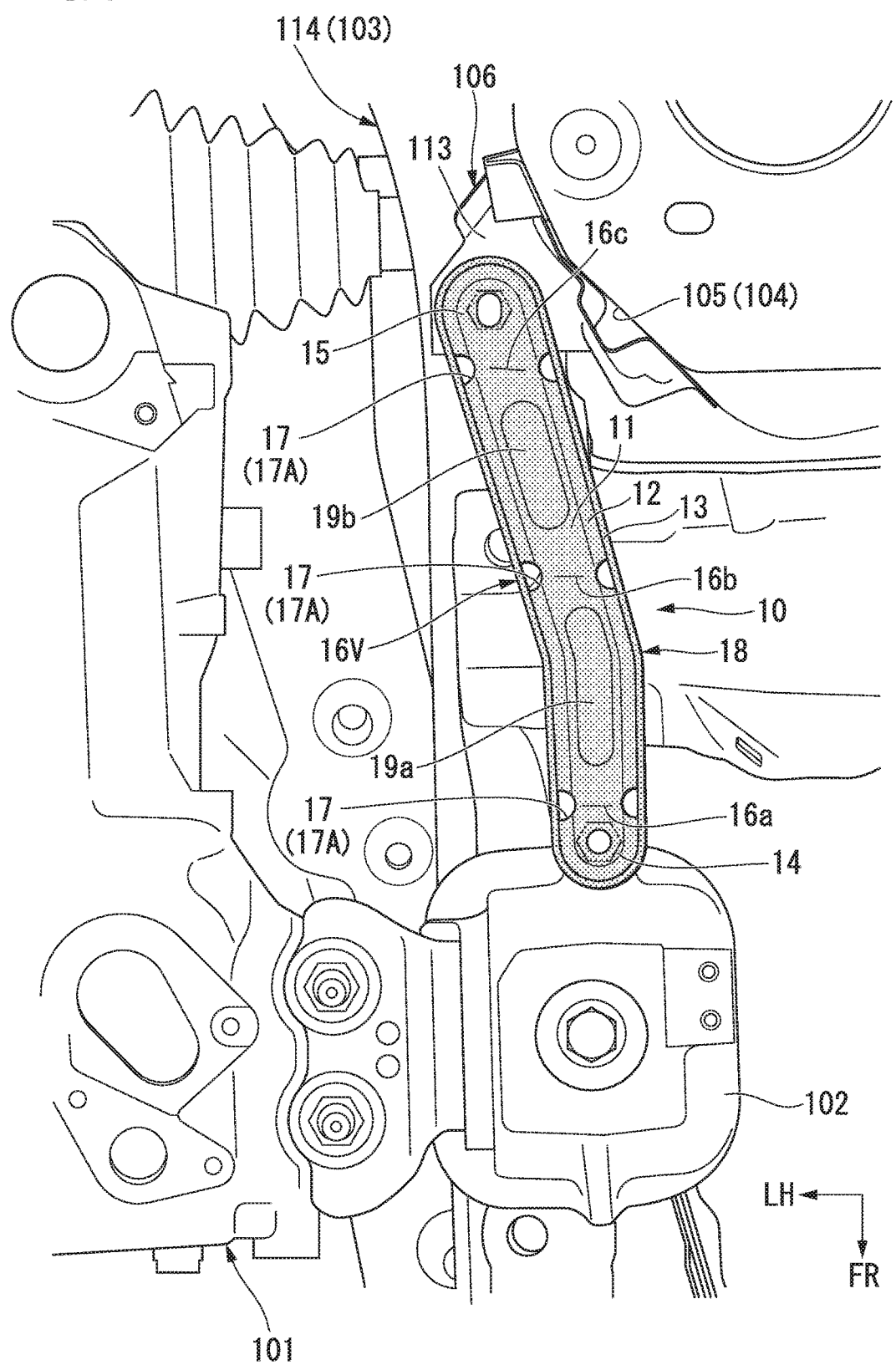
FIG. 6 is a plan view of the right side of the vehicle front structure.
Figure 7:
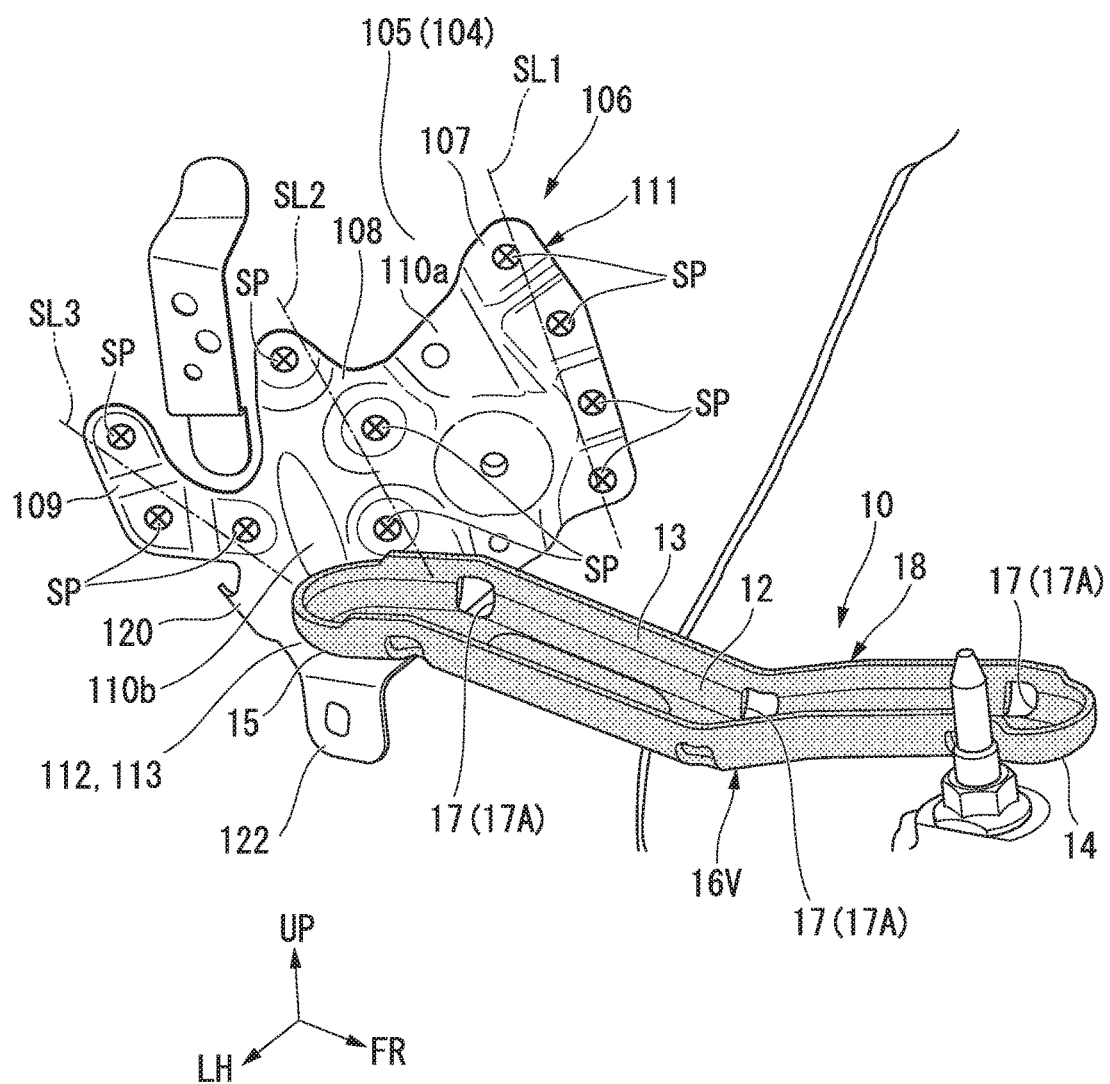
FIG. 7 is a perspective view of the connecting member and a connecting bracket of the right side of the vehicle front structure.

As shown in FIGS. 6 and 7, the front fastening section 14 of the connecting member 10 is fastened to a fastening section of an upper surface of the mount section 102 by a bolt. In addition, the connecting bracket 106 to which the rear fastening section 15 of the connecting member 10 is fastened by the bolt is coupled to an inner sidewall 105 of the damper housing 104 by welding. The connecting bracket 106 includes a sidewall section 111 formed along the inner sidewall 105, and a lateral wall section 113 bent inward in the vehicle body widthwise direction and extending from a lower end of the sidewall section 111. The lateral wall section 113 forms a fastening seat surface 112 having a nut formed at a lower surface and to which the rear fastening section 15 of the connecting member 10 is fastened.

The sidewall section 111 has a front fixing section 107, an intermediate fixing section 108 and a rear fixing section 109 formed in forward and rearward direction. The fixing sections 107, 108 and 109 have a plurality of spot-welded sections SP (plurality of coupling sections) formed in upward and downward direction, and central axes SL1, SL2 and SL3 defined by the alignments of the spot-welded sections SP become gradually more inclined toward rearward as the central axe is positioned at more rear side. The beads 110a and 110b extending upward and downward are formed between the central axes SL1, SL2 and SL3 formed in forward and rearward direction.

Figure 8:
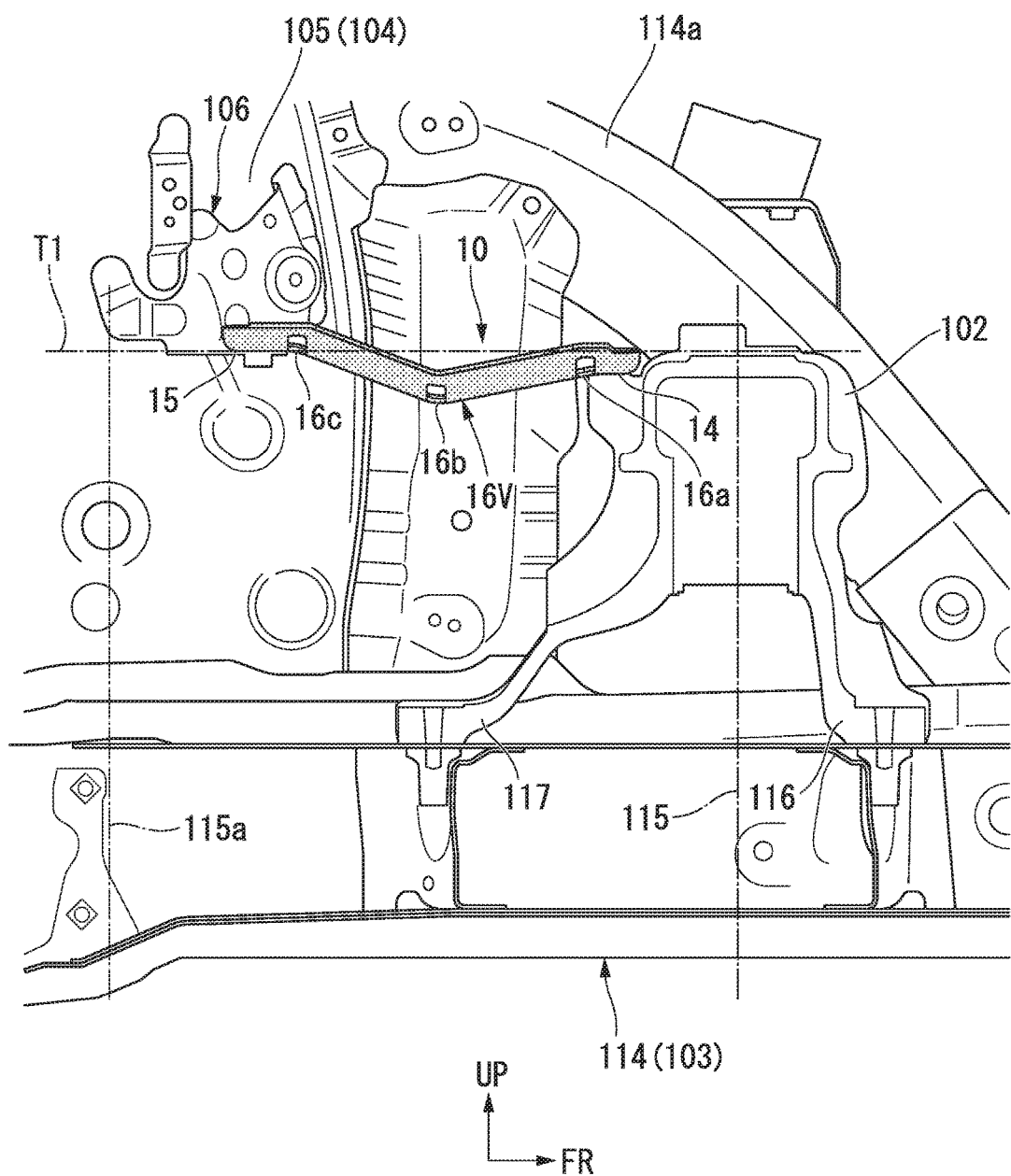
FIG. 8 is a side view showing the connecting member, the connecting bracket and a mount section of the right side of the vehicle front structure from the inside in the vehicle widthwise direction.

As shown in FIG. 8, the mount section 102 of the power unit 101 has a front fastening section 116 and a rear fastening section 117 that are fixed to front and rear sides of a folded section 115 in front of the front side frame 114. Here, the front side frame 114 has folded sections 115a of front and rear intermediate sections behind a rear end of the connecting member 10 and a folded section (not shown) of a rear side in the vicinity of the dash lower panel DL, in addition to the folded section 115 of the front side that is folded and deformed upon collision. The front side frame 114 can be bent leftward and rightward from the folded section as a starting point to absorb collision energy.

The front fastening section 14 and the rear fastening section 15 of the connecting member 10 are disposed at substantially the same vertical height T1. The connecting member 10 connects the mount section 102 of the power unit 101 fastened to the front side frame 114 and the connecting bracket 106 of the damper housing 104 in the longitudinal direction, and the V-shaped section 16V is disposed between the mount section 102 and the connecting bracket 106.

Figure 9:
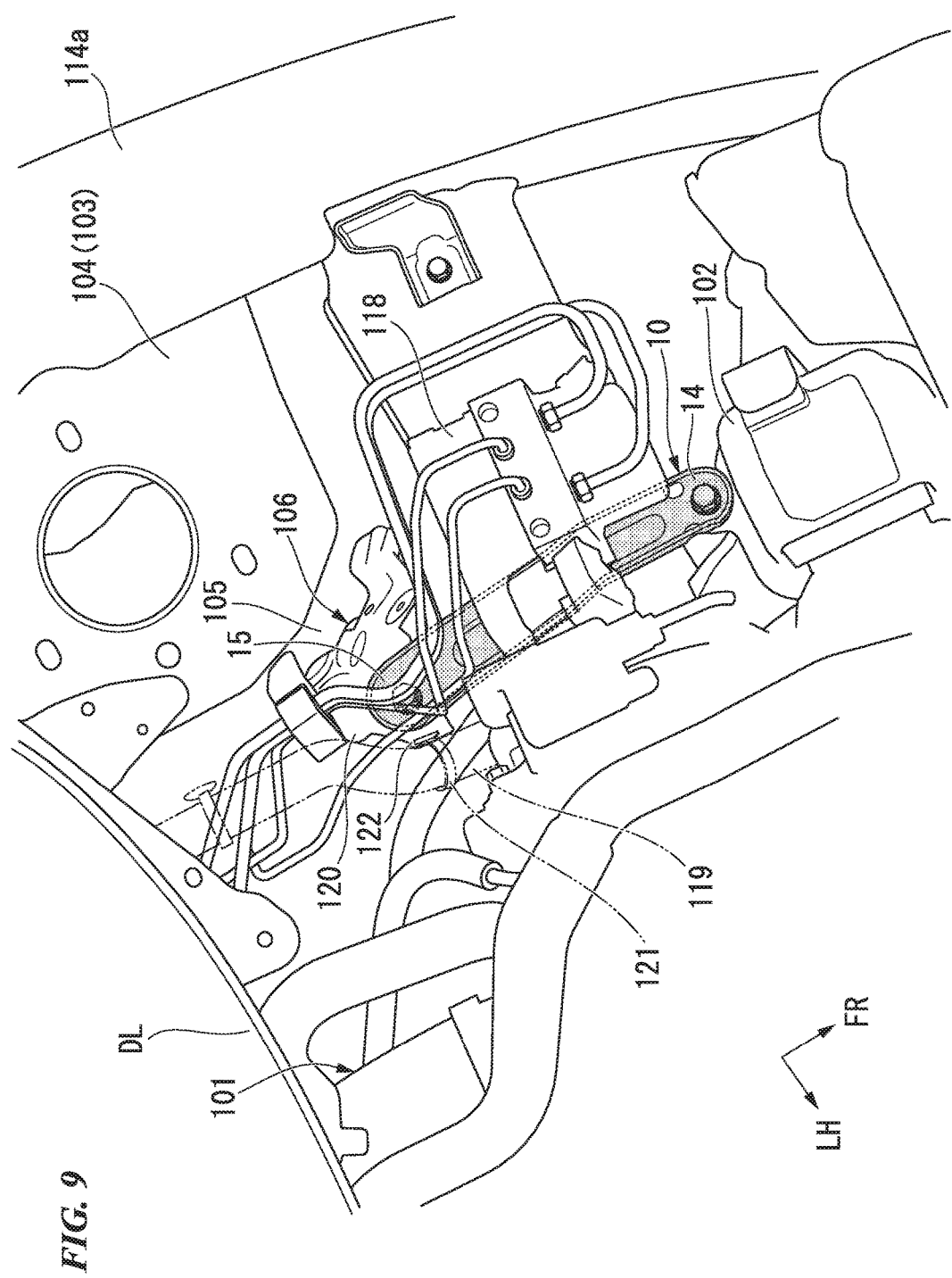
FIG. 9 is a perspective view showing routing of cables around the connecting member of the right side of the vehicle front structure.

As shown in FIG. 9, the connecting bracket 106 has a clearance-shaped section 120 formed by folding a flange distal end toward the inner sidewall 105 of the damper housing 104 at a portion adjacent to a cable 119 extending from electronic parts 118 such as a relay or the like disposed in the vicinity thereof. In addition, the connecting bracket 106 has an attachment seat surface 122 of a band clip 121 configured to hold the cable 119 in the vicinity of the clearance-shaped section 120.

Figure 10:
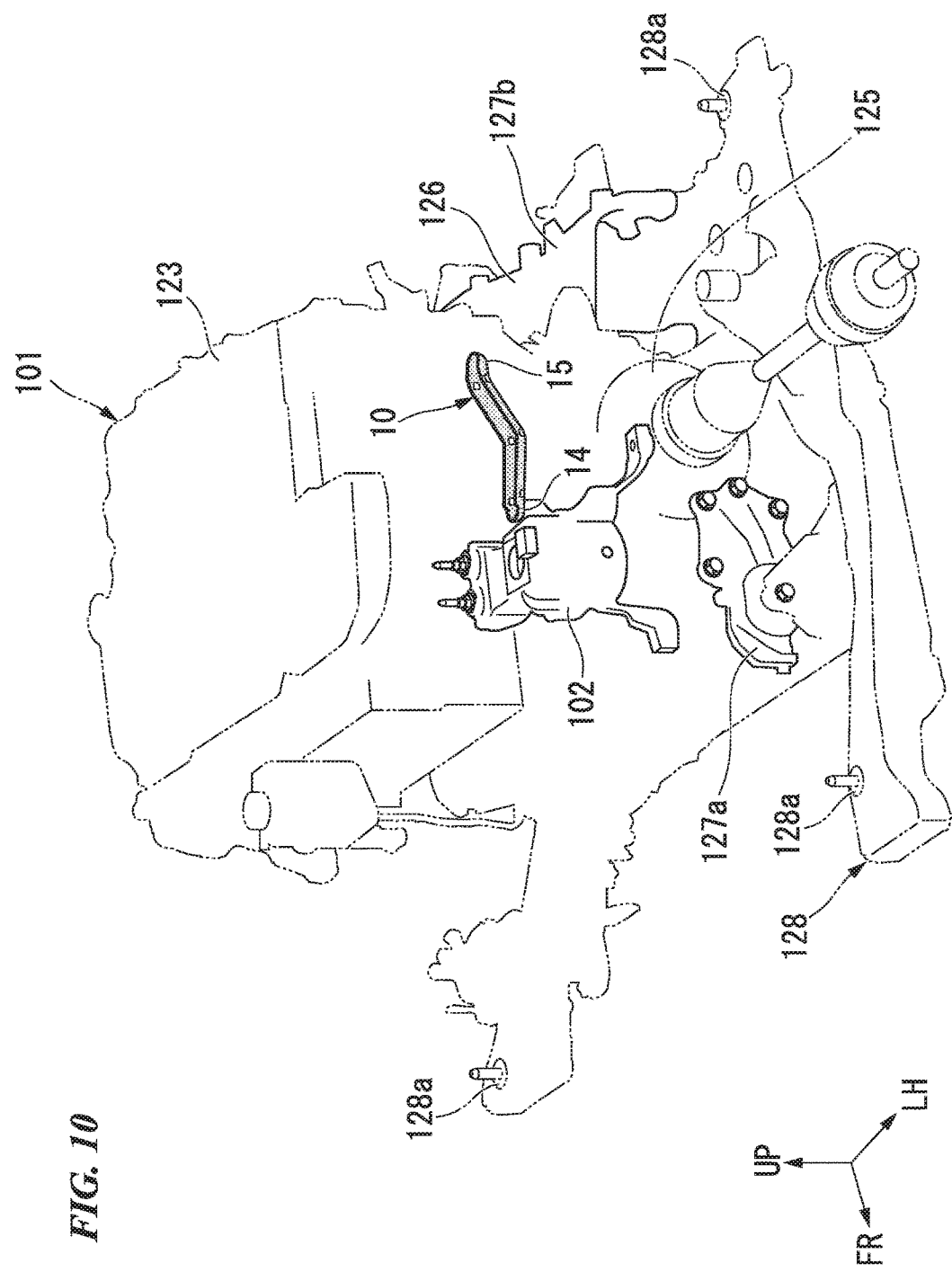
FIG. 10 is a perspective view around a power unit of the vehicle front structure.
Figure 11:
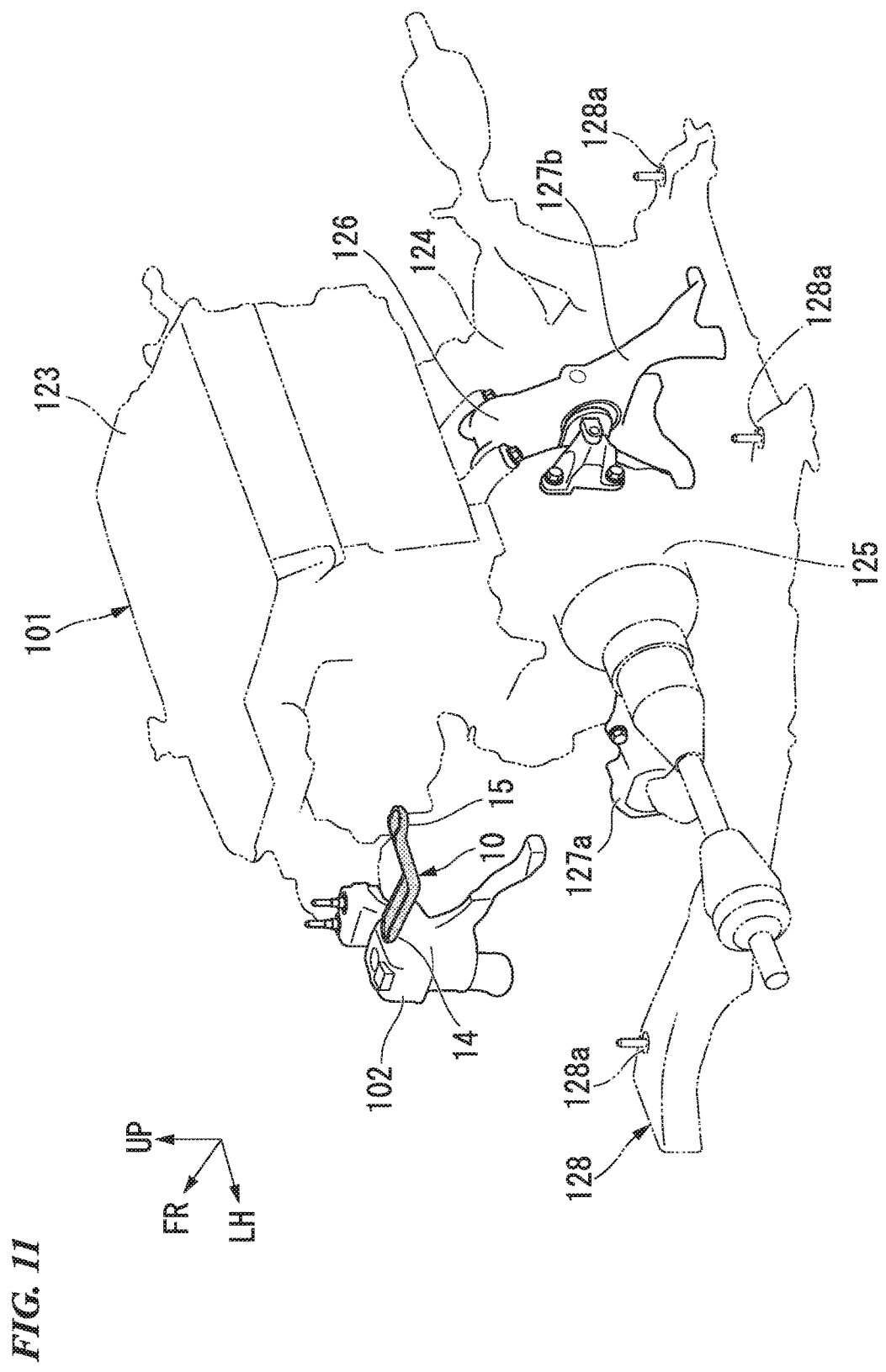
FIG. 11 is a perspective view around the power unit shown in a direction different from that of FIG. 10.

As shown in FIGS. 10 and 11, the power unit 101 includes a fuel cell stack 123, a motor 124 and a transmission 125. That is, a vehicle of the embodiment is a fuel cell vehicle.

The fuel cell stack 123 is elastically supported both of left and right sides of the front section by the left and right mount sections 102 of the front side frame 114, and left and right intermediate sections of a rear lower section are supported by a stack sub-frame fastening section 126. The front section and the rear section of the motor 124 and the transmission 125 are supported at front and rear motor/mission sub-frame fastening sections 127a and 127b, respectively. The stack sub-frame fastening section 126 and the motor/mission sub-frame fastening sections 127a and 127b are formed at a sub-frame 128 having a double cross form when seen in a plan view.

Figure 13:
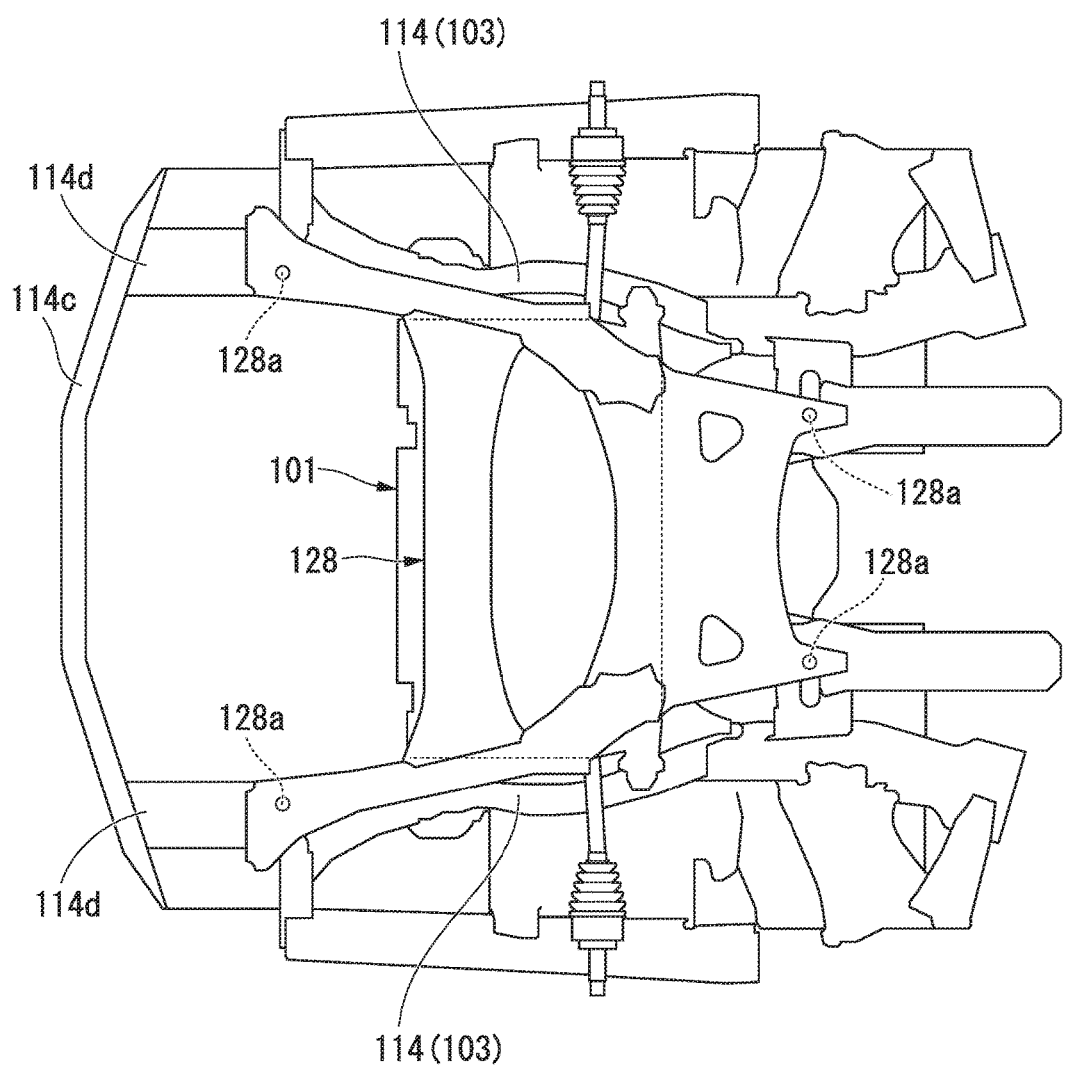
FIG. 13 is a bottom view of the vehicle front structure.

As shown in FIGS. 12 and 13, since the sub-frame 128 is connected to the front side frame 114 from below, the power unit 101 is mounted on the sub-frame 128. In the power unit 101, the fuel cell stack 123 is disposed above the motor 124 and the transmission 125, and a power control unit (PCU) 129 is disposed in front thereof.

The sub-frame 128 couples frame coupling sections 128a disposed at four corners when seen in a plan view to the front side frame 114. The front side frame 114 folds and deforms in a lateral direction from three folded sections substantially horizontally upon collision from the forward side. Meanwhile, the sub-frame 128 has front and rear split configurations, is folded and deformed in a V shape protruding downward upon collision from the forward side, and falls downward from the front side frame 114 together with the power unit 101.

Figure 14A:
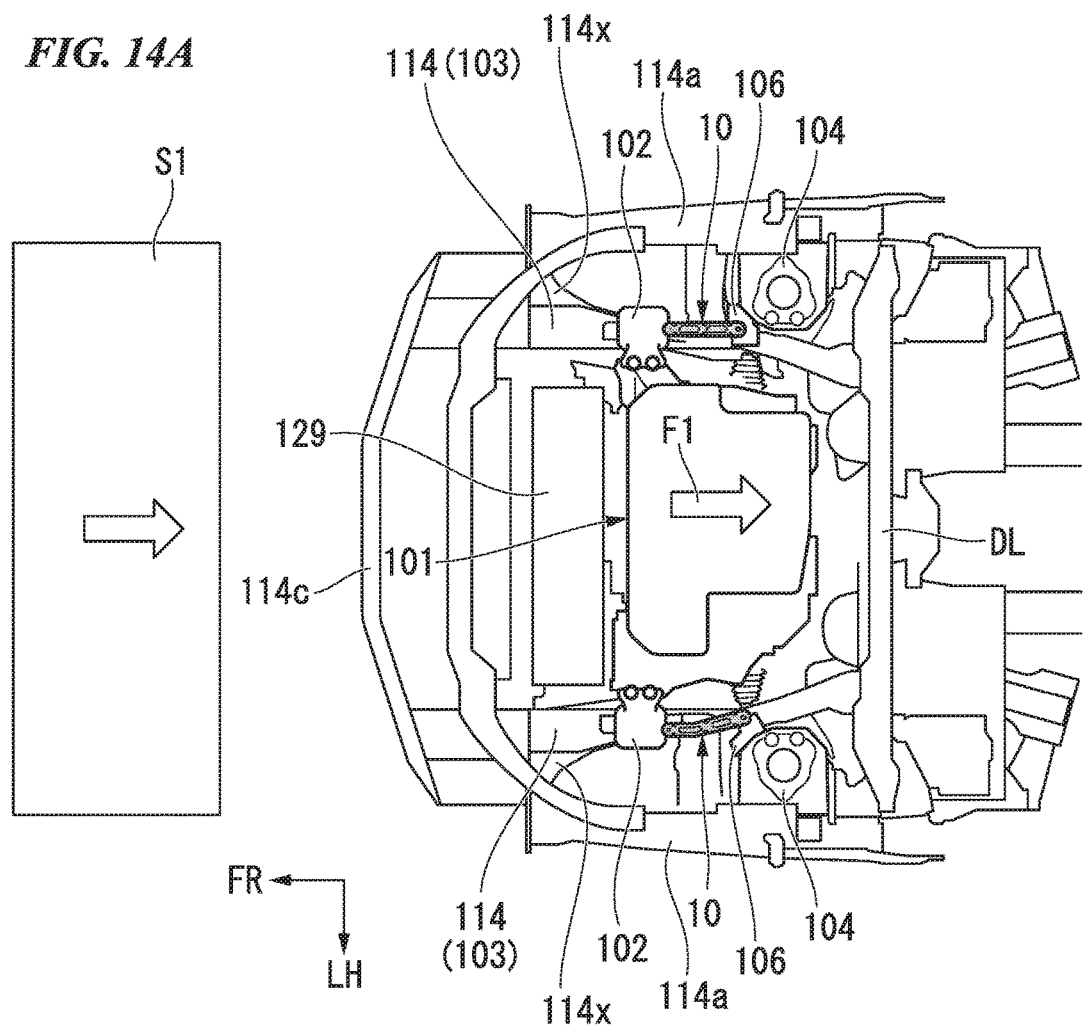
FIG. 14A is a plan view of the vehicle front structure upon full flat collision.
Figure 14B:
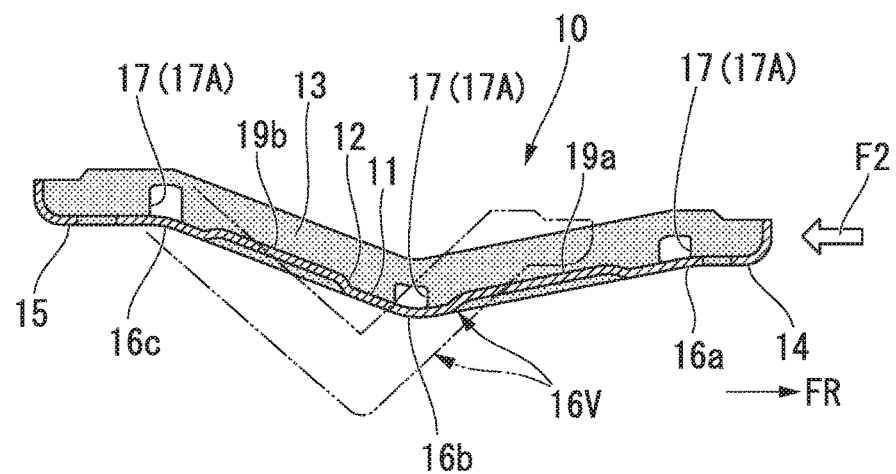
FIG. 14B is a side view showing deformation of the connecting member upon full flat collision.

As shown in FIGS. 14A and 14B, upon full flat collision with an obstacle S1, a load is input into the power unit 101 from a forward side thereof in due time while the front side frame 114 is deformed to absorb energy, and the power unit 101 is moved rearward as shown by an arrow F1 in FIG. 14A with respect to the vehicle body 103. Here, the connecting member 10 absorbs energy upon collision and suppresses stress concentration of the front fastening section 14 and the rear fastening section 15 as the connecting member 10 is deformed while folding the V-shaped section 16V according to a load of a rear side as shown by an arrow F2 in FIG. 14B. Here, since the connecting member 10 does not thrust with respect to leftward and rightward deformation of the front side frame 114, absorption of energy by the front side frame 114 is not interfered with the connecting member 10.

Figure 15A:
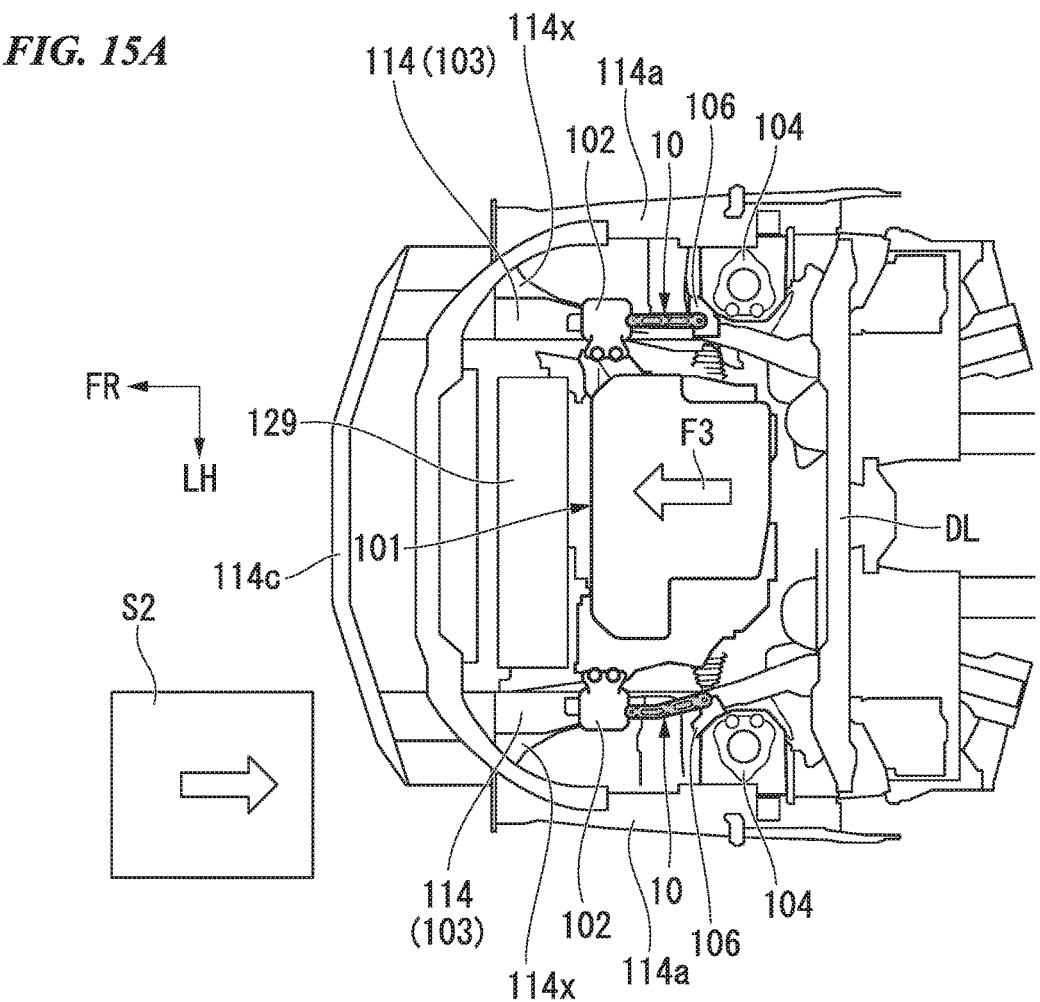
FIG. 15A is a plan view of the vehicle front structure upon small overlap collision.
Figure 15B:
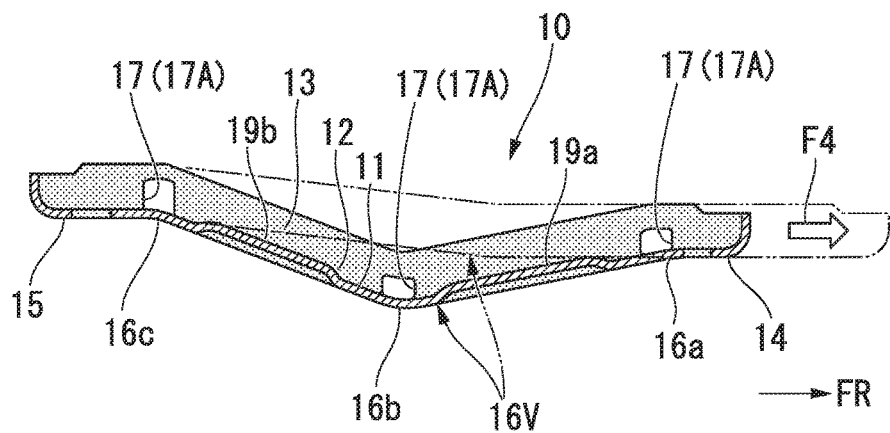
FIG. 15B is a side view showing deformation of the connecting member upon small overlap collision.

As shown in FIGS. 15A and 15B, upon small overlap collision with an obstacle S2, a load is input into a load transfer member 114x that connects the upper members 114a, a pair of left and right front side frames 114 are deformed to absorb energy, and the power unit 101 is moved forward as shown by an arrow F3 in FIG. 15A with respect to the vehicle body 103 by inertia without inputting the load into the power unit 101 from the forward side. Here, as the V-shaped section 16V is deformed while being flatly stretched by a load of a forward side shown by an arrow F4 in FIG. 15B, the connecting member 10 can absorb energy upon collision, suppress stress concentration of the front fastening section 14 and the rear fastening section 15, and suppress the power unit 101 from jumping out to the front with respect to the vehicle body 103.

As shown in FIG. 8, since the front fastening section 116 and the rear fastening section 117 of the mount section 102 are fixed to the front side frame 114 at front and rear sides of the folded section 115 of the forward side, upon the above-mentioned collision, even when the front side frame 114 is bent and deformed leftward and rightward, the front fastening section 116 and the rear fastening section 117 of the mount section 102 are broken in the same way. Accordingly, upon forward collision, the mount section 102 of the power unit 101 cannot easily move in the vehicle body widthwise direction, the connecting member 10 maintains a posture in the longitudinal direction, and the connecting bracket 106 of the damper housing 104 also maintains the same posture. Accordingly, the connecting bracket 106 is supported by a load in a strong shearing direction, rather than a separation direction, with respect to the inner sidewall 105 of the damper housing 104, and a support load of the connecting member 10 is increased.

As described above, according to the vehicle front structure of the embodiment, since the connecting member 10 formed of the belt-shaped metal plate includes the plate-shaped bottom section 11, a folded section 12 formed by folding a circumferential edge of the bottom section 11 and the circumferential wall section 13 that is formed in a continuous annular shape and that continues to the bottom section 11 via the folded section 12 and the bottom section 11 of the connecting member 10 is formed in the V shape upward or downward in the longitudinal direction. Therefore, it is possible to provide sufficient strength and stiffness in the connecting member 10 by the folded section 12 and the circumferential wall section 13, an absorption amount of energy by deformation can be increased, and support stiffness of the power unit 101 can be increased to decrease vibrations of the power unit 101.

In addition, upon full flat collision, since the connecting member 10 is deformed while being folded in the V shape to absorb energy, absorption of energy upon deformation of the front side frame 114 is not interfered with and stress concentration of the fastening sections 14 and 15 can be suppressed.

In addition, upon small overlap collision, since the connecting member 10 is deformed while flatly stretching the V shape to absorb energy, stress concentration of the fastening sections 14 and 15 can be similarly suppressed, and the power unit 101 can be suppressed from jumping out to the front.

In this way, in either of small overlap collision and full flat collision, energy absorption by the connecting member 10 becomes possible, stress concentration of the fastening sections 14 and 15 with respect to the power unit 101 and the vehicle body 103 of the connecting member 10 can be avoided, vibrations of the vehicle body can be decreased, and collision performance can be increased.

In addition, according to the vehicle front structure, since the hole forming section 17A is formed in the connecting member 10 and the hole forming section 17A forms the holes 17 at positions that corresponds to or coincide with the second folded sections 16a, 16b and 16c in the first folded section 12 and the holes 17 are formed to a size at which the circumferential wall section 13 remains. Therefore, support stiffness of the power unit 101 due to the connecting member 10 is not lost due to the annular circumferential wall section 13, folding and deformation of the V shape of the connecting member 10 upon full flat collision becomes easy because a low strength section can be set from the folded sections 16a, 16b and 16c serving as starting points of folding when the connecting member 10 is deformed upon collision, and since deformation of the front side frame 114 is not further interfered with the connecting member 10, an energy absorption amount of the front side frame 114 can be increased.

In addition, according to the vehicle front structure, since the connecting member 10 connects the mount section 102 of the power unit 101 the damper housing 104 of the vehicle body 103 in the longitudinal direction with respect to the front side frame 114 of the vehicle body 103. Therefore, a sufficient deformation space is set between the mount section 102 of the power unit 101 and the damper housing 104 of the vehicle body 103. Accordingly, upon full flat collision, the connecting member 10 does not interfere with absorption of energy upon deformation of the front side frame 114 as the connecting member 10 is deformed while being folded in a V shape. Additionally, upon small overlap collision, the power unit 101 can be suppressed from jumping out to the front as the V shape is deformed while being flatly stretched.

In addition, according to the vehicle front structure, since the connecting member 10 forms the folded section 18 at a position different from the folded sections 16a, 16b and 16c of the bottom section 11 when seen in a plan view and forms the bead shapes 19a and 19b that do not cross the folded sections 16a, 16b and 16c at the folded section 18. Therefore, a disposition space of the power unit 101 and peripheral parts can be secured by displacing the connecting member 10 in the lateral direction without interference with deformation of the folded sections 16a, 16b and 16c of the connecting member 10.

In addition, according to the vehicle front structure, since the rear fastening section 15 of the connecting member 10 is fastened to the connecting bracket 106 fixed to the inner sidewall 105 of the damper housing 104, the connecting bracket 106 includes the sidewall section 111 fixed to the damper housing 104 and the lateral wall section 113 having the fastening seat surface 112 formed by folding the lower end of the sidewall section 111 toward a center in the vehicle body widthwise direction, the sidewall section 111 has plurality of the fixing sections 107, 108 and 109 at front and rear sides, the plurality of fixing sections 107, 108 and 109 extend in the vertical direction and in sequence from the fixing section of the forward side, the central axes SL1, SL2 and SL3 are gradually inclined rearward, and the beads 110a and 110b in the vertical direction are formed between the plurality of fixing sections 107, 108 and 109. Therefore, even when the connecting bracket 106 configured to fasten the connecting member 10 is fixed to the damper housing 104 by welding, support strength can be improved by a load in a shearing direction of a welded section SP, and the power unit 101 can be further suppressed from jumping out.

In addition, according to the vehicle front structure, since the rear fastening section 15 of the connecting member 10 is fastened to the connecting bracket 106 fixed to the damper housing 104 and the connecting bracket 106 has the clearance-shaped section 120 with respect to the cable 119 of the electronic parts 118 and the attachment seat surface 122 configured to attach the band clip 121 of the cable 119. Therefore, overhanging of the cable 119 into the mounting space of the power unit 101 can be suppressed, and the mounting space of the power unit 101 can be effectively used.

In addition, according to the vehicle front structure, since the front fastening section 14 of the connecting member 10 is fastened to the mount section 102 of the power unit 101 and disposed at the same vertical height T1 as the rear fastening section 15. Therefore, upon full flat collision, the connecting member 10 can be easily deformed while being folded in a V shape, and upon small overlap collision, since the V shape can be easily deformed while being flatly stretched, energy can be effectively absorbed.

In addition, according to the vehicle front structure, since the mount section 102 of the power unit 101 has the front fastening section 116 and the rear fastening section 117 fixed to the front and rear sides of the folded section 115 of the forward side of the front side frame 114. Therefore, upon small overlap collision, when the front side frame 114 is folded at the folded section 115, since the front fastening section 116 and the rear fastening section 117 of the mount section 102 are similarly broken, movement in the vehicle body widthwise direction of the mount section 102 is suppressed, and the connecting member 10 maintains a posture in the longitudinal direction. Accordingly, separation of the connecting bracket 106 from the damper housing 104 can be suppressed, the connecting bracket 106 and the connecting member 10 can be supported by a strong shearing load, and the power unit 101 can be further suppressed from jumping out.

In addition, according to the vehicle front structure, since the power unit 101 includes the fuel cell stack 123, the motor 124 and the transmission 125 and is mounted on the sub-frame 128 fixed to the front side frame 114, the fuel cell stack 123 is fixed to the mount section 102 and the stack sub-frame fastening section 126 of the sub-frame 128, the motor 124 and the transmission 125 are fixed to the motor/mission sub-frame fastening sections 127a and 127b of the sub-frame 128, the front side frame 114 is folded and deformed leftward and rightward upon collision from a forward side thereof, and the sub-frame 128 can be folded and deformed in a V shape protruding downward upon collision from a forward side to fall from the front side frame 114. Therefore, upon full flat collision and small overlap collision, the power unit 101 can be suppressed from being retracted and deforming the dash lower panel DL toward the vehicle compartment.

In addition, according to the vehicle front structure, since the fuel cell stack 123 is disposed above the motor 124 and the transmission 125 and the power control unit 129 is disposed at a forward side in the power unit 101. Therefore, the power unit 101 and the power control unit 129 can be efficiently disposed, and the mounting space of the power unit 101 can be effectively used.

Further, the present invention is not limited to the embodiment but various design changes may be made without departing from the spirit of the present invention. For example, the present invention is not limited to the configuration in which the mount section overhanging outward in the vehicle body widthwise direction of the power unit and the damper housing overhanging inward in the vehicle body widthwise direction of the vehicle body are connected by the connecting member but may be applied to a configuration in which the connecting member connects other portions. In addition, the present invention is not limited to the fuel cell vehicle but may be applied to an engine vehicle including an internal combustion engine, an electrically driven vehicle including a secondary battery instead of a fuel cell, or a hybrid vehicle including an engine and a motor.

Further, the configuration according to the embodiment is an example of the present invention and various modifications may be made without departing from the scope of the present invention. For example, even when the circumferential wall section formed in a continuous annular shape is cut out at a portion of an end section in the longitudinal direction, it is included in the present invention as long as the above-mentioned effects are exhibited.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle front structure comprising:
a connecting member formed of a belt-shaped metal plate configured to couple a power unit and a vehicle body, wherein the connecting member has a first fastening section provided at one end portion of the connecting member in a longitudinal direction and a second fastening section provided at other end portion of the connecting member in the longitudinal direction, the first fastening section being fastened to a connecting bracket fixed to a damper housing of the vehicle body and the second fastening section being fastened to a mount section of the power unit,
wherein the connecting member includes a plate-shaped bottom section, a first folded section formed by folding a circumferential edge of the bottom section and a circumferential wall section that is formed in a continuous annular shape and that continues to the bottom section via the first folded section,
wherein the bottom section of the connecting member is formed between the first fastening section and the second fastening section in the longitudinal direction and is formed in a V shape protruding upward or downward in the longitudinal direction.

2. The vehicle front structure according to claim 1,
wherein a second folded section bent upward or downward is formed at the bottom section, and
wherein a hole forming section is formed in the first folded section of the connecting member at a position that corresponds to a position where the second folded section is formed at the bottom section,
wherein the hole forming section includes a hole which is formed to a size such that the circumferential wall section remains.

3. The vehicle front structure according to claim 1,
wherein the connecting member connects the mount section of the power unit and the damper housing of the vehicle body in the longitudinal direction with respect to a front side frame of the vehicle body.

4. The vehicle front structure according to claim 2,
wherein the connecting member connects the mount section of the power unit and the damper housing of the vehicle body in the longitudinal direction with respect to a front side frame of the vehicle body.

5. The vehicle front structure according to claim 2,
wherein a third folded section bent in a lateral direction is formed in the connecting member at a position different from the second folded section of the bottom section when seen in a plan view, and
wherein a bead shape that does not cross the second folded section is formed at the third folded section.

6. The vehicle front structure according to claim 3,
wherein the connecting bracket includes a sidewall section fixed to an inner sidewall of the damper housing of the vehicle body and, a lateral wall section having a fastening seat surface formed by folding a lower end of the sidewall section toward a center in a vehicle body widthwise direction,
wherein a plurality of fixing sections for fixing the side wall section to the inner sidewall of the damper housing of the vehicle body is formed at front and rear sides of the sidewall section,
wherein the plurality of fixing sections respectively include a plurality of coupling sections arranged in upward and downward direction,
wherein the plurality of fixing sections are arranged so that each of central axes of the plurality of fixing sections are defined by alignments of the plurality of coupling sections, respectively, and, among the plurality of fixing sections, the central axis of the fixing section which is positioned closer to the rear sides more inclined rearward than the central axis of the fixing section which is positioned closer to the front side, and
wherein bead shapes in a vertical direction are formed between the plurality of fixing sections.

7. The vehicle front, structure according to claim 3,
wherein the connecting bracket includes a clearance-shaped section with respect to a cable of an electronic part and an attachment seat surface configured to attach a band clip of the cable.

8. The vehicle front structure according to claim 7,
wherein the second, fastening section of the connecting member is arranged at the substantially same vertical height as the first fastening section.

9. The vehicle front structure according to claim 8,
wherein the mount section of the power unit includes a front fastening section and a rear fastening section fixed to the front side frame at front and rear sides of the folded section of the forward side of the front side frame.

10. The vehicle front structure according to claim 3, further comprising the power unit including a fuel cell stack, a motor and a, transmission, the front side frame and a sub-frame fixed to the front side frame,
wherein the power unit is mounted on a sub-frame,
wherein the fuel cell stack is fixed to the mount section and a stack sub-frame fastening section of the sub-frame,
wherein the motor and the transmission are fixed to a trio or/mission sub-frame fastening, section of the sub-frame,
wherein the front side frame is folded and deformed upon collision from a forward side, and
wherein the sub-frame is able to be folded and deformed in a V shape protruding downward upon collision from the forward side to fall from the front side frame.

11. The vehicle front structure according to claim 10, further comprising a power control unit,
wherein, in the power unit, the fuel cell stack is arranged above the motor and the transmission and,
wherein the power control unit is arranged in front of the power unit.

12. A vehicle front structure comprising:
a connecting member formed of a belt-shaped metal plate configured to couple a power unit and a vehicle body,
wherein the connecting member includes a plate-shaped bottom section, a first folded section formed by folding a circumferential edge of the bottom section and a circumferential wall section that is formed in a continuous annular shape and that continues to the bottom section via the first folded section,
wherein the bottom section of the connecting member is formed in a V shape protruding upward or downward in a longitudinal direction, and
wherein a second folded section bent upward or downward is formed at the bottom section, and
wherein a hole forming section is formed in the first folded section of the connecting member at a position that corresponds to a position where the second folded section is formed at the bottom section,
wherein the hole forming section includes a hole which is formed to a size such that the circumferential wall section remains.

* * * * *